July 20, 1965

C. P. SPAULDING ETAL 3,196,428

ANALOG-TO-DIGITAL CONVERTER

Filed Nov. 14, 1960

INVENTORS.
CARL P. SPAULDING
BY RICHARD J. BAZARD

Christie, Parker & Hale
ATTORNEYS.

July 20, 1965

C. P. SPAULDING ETAL 3,196,428

ANALOG-TO-DIGITAL CONVERTER

Filed Nov. 14, 1960

INVENTORS.
CARL P. SPAULDING
BY RICHARD J. BAZARD

Christie, Parker & Hale
ATTORNEYS.

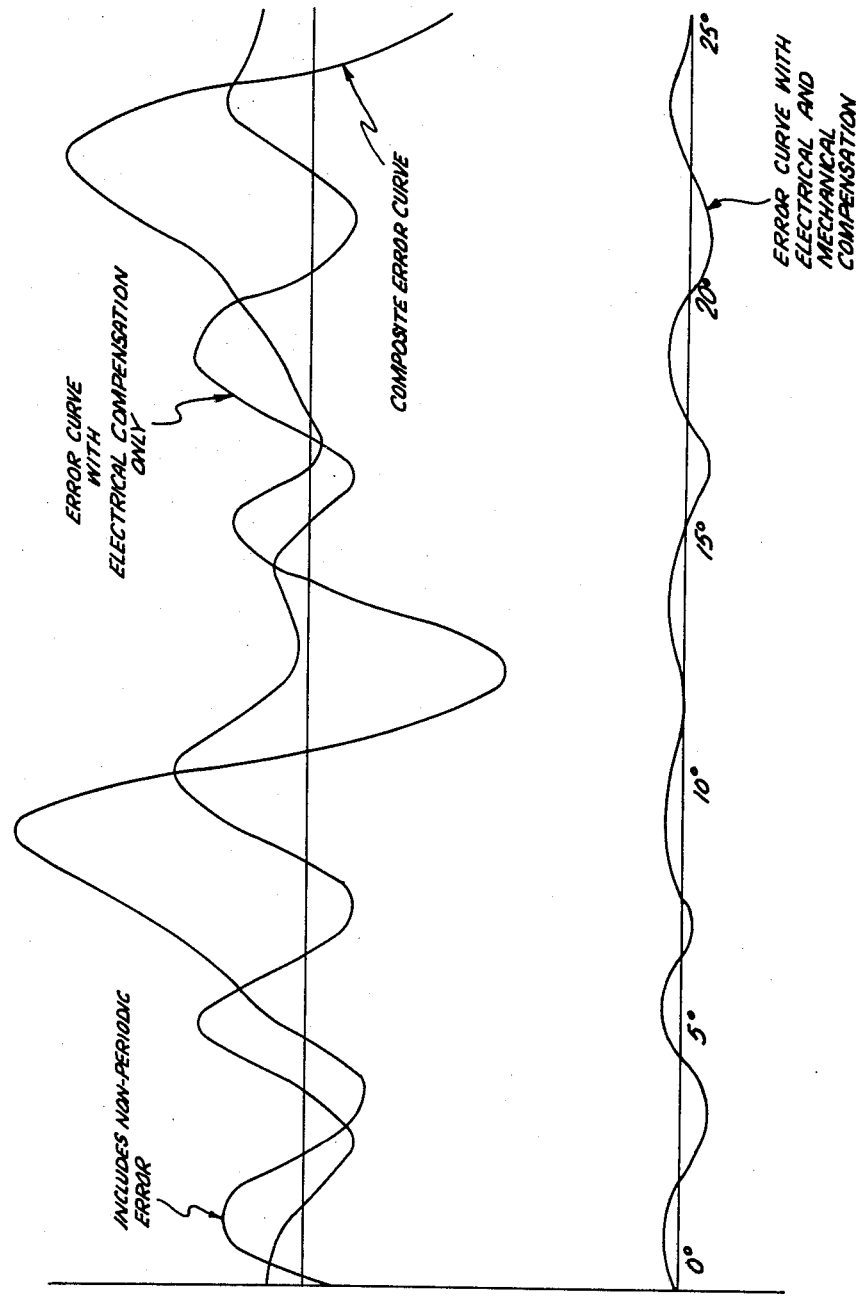

3,196,428
ANALOG-TO-DIGITAL CONVERTER
Carl P. Spaulding, San Marino, and Richard J. Bazard,
West Covina, Calif., assignors to Datex Corporation,
Monrovia, Calif., a corporation of California
Filed Nov. 14, 1960, Ser. No. 69,202
10 Claims. (Cl. 340—347)

This invention relates to analog-to-digital conversion techniques and more particularly to a precision servo system to measure and digitally indicate the angular position of a remote shaft with a high degree of accuracy.

To digitize an analog signal such as the positions of a revolving shaft, an encoder employing a coded disc and sensing elements therefor has been utilized. One of the encoder elements is moved at a rate related to the rotation of the revolving shaft whereby the sensing elements provide unique digital output indications for each position. When it is necessary to digitize all the positions of a revolving shaft in one complete revolution in very small increments within the resolution capabilities of the encoder, the encoder is used in combination with step-up gearing arranged intermediate the shaft to be digitized and the encoder shaft.

For many applications this simple encoder and step-up mechanical gearing arrangement is satisfactory, however, the precision obtainable with an encoder utilized in this manner is not sufficient for indicating the angular position of a shaft when resolutions on the order of seconds of arc are required since the backlash, high inertia, and inherent wear of the parts in a mechanical gearing arrangement prevent such resolution capabilities. When resolutions of this order have been necessary in the past, an electrical step-up gearing for driving an encoder has been utilized to thereby eliminate the backlash and other inaccuracies present in mechanical gearing arrangements. The electrical gearing arrangement for stepping up the shaft rotations has taken the form of a multi-pole resolver. The commercially available multi-pole resolvers, however, have been found to be manufactured to such mechanical and electrical tolerances that errors occur even when the electrical gearing arrangements are employed and which errors limit the resolution capabilities. These electrical gearing arrangements allow the positions of a remote shaft to be digitized by using the multi-pole resolver to indicate positions of the remote shaft and to transmit them to a receiving unit including a single-pole resolver therein. The single-pole resolvers may function as a comparison element in a servo system to indicate the difference between the position of the remote shaft to be digitized and an encoding shaft. The servo system continuously drives the encoder shaft to cause the encoder shaft to rotate in a relationship related to the rotations of the remote shaft and in the correct increments. This arrangement has been found to be very convenient and the errors produced by the multi-pole resolver may be neglected for many applications.

In applications wherein the positions of the remote shaft are related to an object in outer space, however, a slight error between the position of the remote shaft and the actual position of the shaft of the encoder produces a large differential at the remote point that results in an unacceptable result. In a practical example, the remote shaft to be digitized may be the shaft controlling the positions of an antenna for sending signals to a satellite arranged many, many miles in space. A small differential, on the order of seconds of arc, between the encoder shaft and the antenna shaft would result in producing a digital indication that is very many miles from the true relationship of the antenna and the satellite whereby when signals are transmitted from the antenna they will completely miss the satellite. The precision necessary for such a control arrangement is possible by means of the electrical step-up gearing technique if the inherent errors in the resolvers may be compensated or corrected for in some fashion.

This invention provides an improved and economical precision servo system for measuring the angular position of a remote shaft with the improved degree of accuracy including the very high accuracies required for space work. The errors inherent in the use of an electrical step-up gearing arrangement or multi-pole resolver have been separately identified and compensated for by both electrical and mechanical means to cause the controlled shaft to be digitized within seconds of arc. The error signals comprise periodic and non-periodic error signals and the periodic signals may be further characterized as a fundamental and second harmonic signal.

The periodic signals are compensated for by electrical means while the non-periodic signals are compensated for by mechanical means. The fundamental error signal of the periodic type is compensated for by injecting a voltage of substantially the same magnitude and opposite in phase to the loop coupling the electrical step-up gearing or multi-pole resolver to the single turn resolver and thereby nullify this signal. Since the second harmonic signal results from an unbalance in impedance between the coupling loops of the two resolvers, a variable impedance device is incorporated in at least one of these loops to balance the impedance thereof and thereby prevent the generation of the second harmonic error signal. The non-periodic error signal is best handled by producing relative motion between the elements of a shaft position digitizer in a direction to correct for these errors. The mechanical means are compensated for by a cam cut to have a profile corresponding to the predetermined non-periodic error signals. The cam is utilized in combination with a cam follower to produce the relative movement between the digitizing elements.

These and other features of the present invention may be more fully appreciated when considered in the light of the following specification and drawings, in which:

FIG. 4 is a graphical illustration of the generated error curves with and without compensation.

Figure 1:
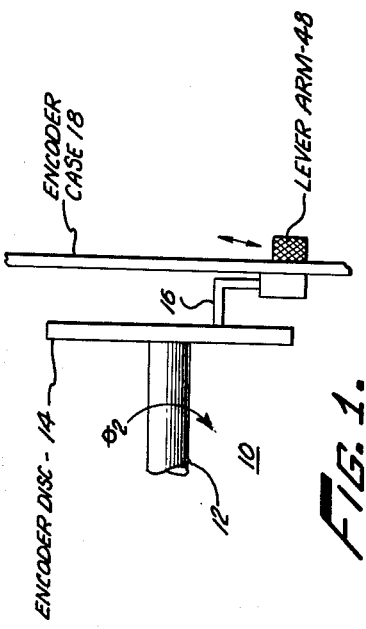
FIG. 1 is a diagrammatic representation of an encoding element embodying the invention.

The analog-to-digital converters utilized for purposes of describing this invention are in the form of shaft position digitizers. The shaft position digitizers 10, as illustrated in FIG. 1, include a rotatable shaft 12 mounting a coded disc 14 having a plurality of segments arranged thereon in a spaced radial relationship. The coded segments may take the form of binary coded segments having conductive and non-conductive properties. The disc 14 is arranged with a plurality of sensing elements shown as the brushes 16 arranged in spaced relationship to individually sense a track on the disc 14 and provide the binary coded electrical indications of the various positions of the shaft 12. The sensing elements or brushes 16 are adapted to be mounted in a stationary position relative to the coded disc 14 and for this purpose the brushes 16 may be mounted on the case 18 housing the brushes 16 and the disc 14.

Figure 2:
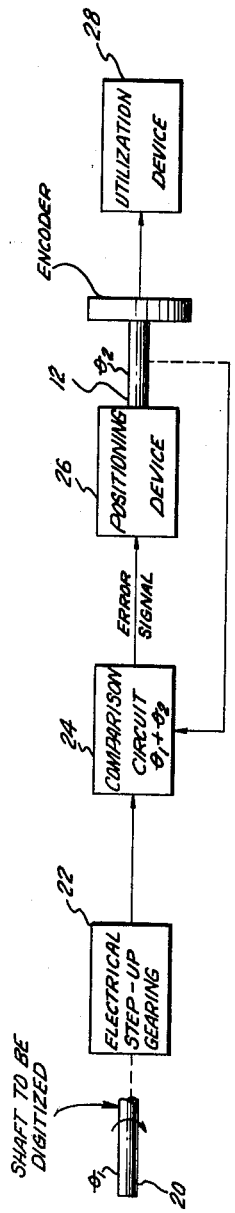
FIG. 2 is a block diagram of a prior art positioning device.

Now referring to FIG. 2, a prior art arrangement utilizing an electrical step-up gearing arrangement for driving the encoder of the type illustrated in FIG. 1 will be examined. The shaft to be digitized is partially shown in FIG. 2 and identified by the reference character 20.

The positions of the shaft 20 may be represented by the symbol $\theta_1$. The shaft 20 may be coupled by means of electrical step-up gearing shown in block form and identified by the reference character 22. The step-up gearing may comprise a multi-pole resolver. The step-up gearing arrangement 22 provides a pair of electrical output signals representative of the position of the shaft 20. The pair of electrical signals are generally recognized as quadrature signals and are defined in the art as sine and cosine signals. The signal provided from the gearing arrangement 22 is then coupled by means of a cable of predetermined length dependent upon the distance between the shaft 20 to a comparison circuit 24. The comparison circuit 24 functions to compare the transmitted position of the shaft 20 and the actual position of the encoder shaft 12 to produce a difference or error signal, if any. The comparison circuit 24 in practical form may be a single-pole resolver with the rotor coils mounted to be rotatable with the encoder shaft 12 and which positions of the encoder shaft may be represented by the symbol $\theta_2$. The error signal developed by the comparison circuit is, in turn, applied to a positioning device or servo motor 26 to drive the shaft 12 of the encoder. The positioning device 26 re-positions the position of the shaft 12 until the two positions $\theta_1$ and $\theta_2$ are equal or to produce an error signal of zero. Upon rotation of the encoder shaft 12, the disc 14 will rotate therewith and the plurality of coded digital signals provided by the sensing elements 14 indicate the angular position of the shaft 20 and which digital signals are applied to a utilization device 28 or data processing system.

Figure 3:
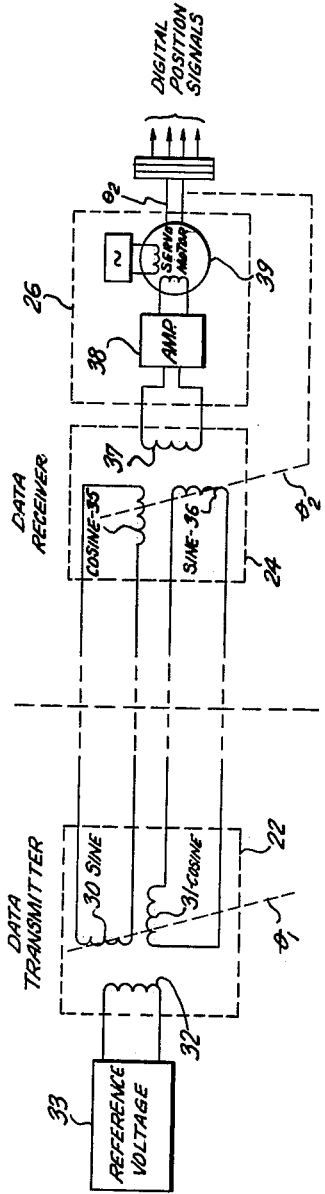
FIG. 3 is a schematic diagram of the prior art system of FIG. 2.

The detailed arrangement of the servo system of FIG. 2 is shown in FIG. 3. The electrical step-up gearing 22 is indicated as a multi-pole resolver having rotor windings 30 and 31 adapted to be mounted on the shaft 20 to be rotatable therewith. The resolver may have twenty-seven poles and therefore performs the same functions as a 27:1 step-up mechanical gearing but without the backlash present therein. The rotor windings 30 and 31 are arranged in quadrature relationship with respect to the stator or stationary reference winding 32. The relationship of the rotor windings 30 and 31 is such that the winding 30 may be considered as a sine winding, while the winding 31 is the cosine winding. The stationary winding 32 is coupled to a source of reference voltage shown in block form and identified by the reference character 33. The reference voltage may be a conventional 400 cycle alternating current source. The sine and cosine terminology for the winding 30 and 31 refer to the relationship of the coupling between these windings and the stationary or primary winding 32 whereby the voltages induced in these windings vary in accordance with the sine and cosine functions. This portion of the servo system may be considered as a data transmitter, particularly when the shaft 20 is located at a remote location from the servo system proper.

The comparison circuit 24 is shown in the form of a single-pole resolver also having a pair of rotor windings 35 and 36 arranged in quadrature relationship with the stator winding 37. The windings 35 and 36 are not only arranged in quadrature relationship but also in a differential relationship with respect to the stator winding 37 to produce the error or difference signal in the output winding. The rotor windings 35 and 36 are mounted to be rotatable with the encoder shaft 12 and thereby are indicative of the actual position of the encoder shaft. The rotor winding 35 is coupled by means of a cable to the rotor winding 30 to form a closed loop. If the rotor winding 30 is considered to be a sine winding, the winding 35 to which it is connected should be the cosine winding, and, in the same fashion, the cosine winding 31 should be connected to the sine winding 36 for the single-pole resolver. When $\theta_1$ is equal to $\theta_2$, or the position of the shaft 20 is equivalent to the position of the encoder shaft 12, no error signal will be produced in the output winding 37. However, when $\theta_1$ is not the same as $\theta_2$, an error signal will be produced in the output winding 37 which is, in turn, applied to a servo amplifier 38 for energizing a servo motor 39 coupled to drive the encoder shaft 12 in a direction to correct for the error. The above-described servo arrangement is conventional and forms no part of the present invention.

The multi-pole resolvers that are commercially available have been found to include error signals as a result of the mechanical and electrical tolerance in the manufacture thereof. These error signals have been found to include periodic and non-periodic error signals. The periodic error signals have been further identified as a fundamental error signal and a second harmonic error signal. In the case of a multi-pole resolver these periodic signals appear for each pole of the resolver, and, therefore, the positional error signal will be identical for all the poles of the resolver, in this instance twenty-seven. To increase the precision of the prior art type of servo arrangements, some means for correcting these error signals is necessary. A simple and inexpensive arrangement for correcting these periodic signals in accordance with the teachings of this invention is to use an electrical means for correcting the periodic signals while correcting the non-periodic errors by means of mechanical means after the electrical correction has been applied.

Briefly, the electrical correction means for the fundamental and second harmonic error signals comprises the injection of a compensating voltage in at least one of the loops coupling a rotor winding of the multi-pole resolver and the single-pole resolver, in a fashion to maintain the impedance of both loops in substantial balance. The compensating voltage is coupled into the rotor loop and proportioned to be of substantially the same magnitude and opposite in phase to the fundamental, periodically recurring error signals. The mechanical correction for the non-periodic signals comprises the utilization of a correction cam having the predetermined non-periodic errors recorded thereon and applied to the encoder to produce the desired correction.

The composite error curve for a twenty-seven pole resolver is shown in FIG. 4. The resulting error curves are also shown when first, electrical compensation alone is employed and when both electrical and mechanical compensation is employed. It will be appreciated that the subtraction of the periodic errors from the composite output signal will leave a difference signal which is equivalent to the non-periodic error signal.

Figure 5:
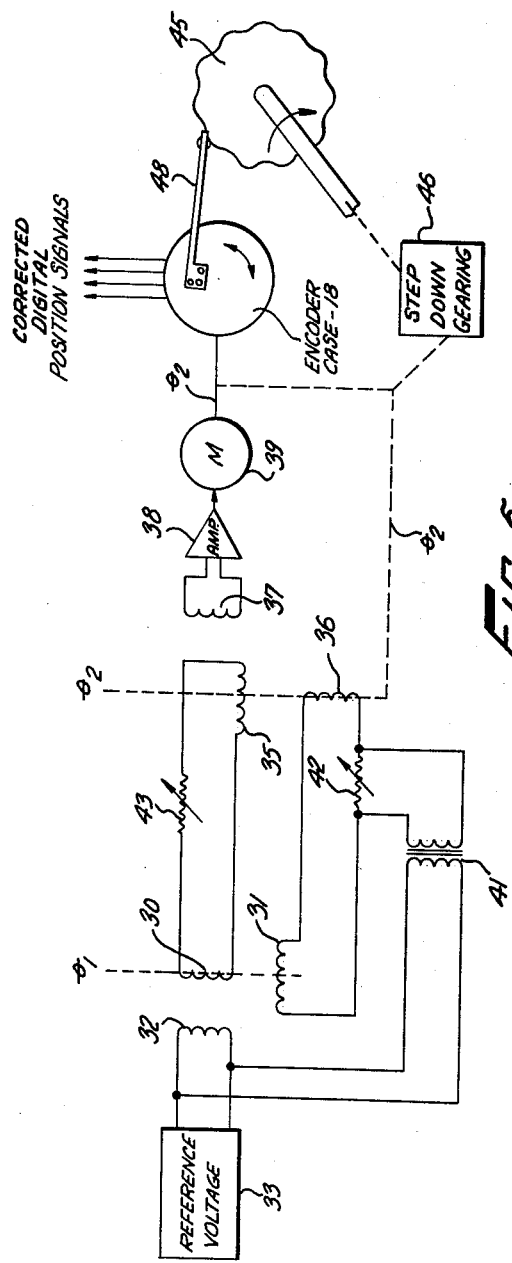
FIG. 5 is a schematic representation of the positioning system embodying the invention.

Now referring to FIG. 5 the electrical compensating arrangement of this invention will be discussed in more detail. The compensation for the fundamental error occurring in the loops is corrected by inducing a voltage in either one or both of the transmission loops of the same magnitude but opposite in phase from the fundamental error voltage. This compensation is effected by means such as illustrated in FIG. 5, wherein the compensating voltage is derived from the reference voltage source 33 and applied to the transmission loop by means of a transformer 41 having its secondary connected across a variable resistor 42. To maintain the transmission loops in balance, a resistor 43 having the same resistance as the resistor 42 is provided for the other transmission loop. The loop to which the compensating voltage is applied depends on the phase of the fundamental error signal and it may be necessary in certain instances to provide a compensating voltage to both of the loops.

It should be noted that the phase of the second harmonic error signal cannot be corrected by this method, however, since the second harmonic signal is generated as a result of an unbalanced impedance relationship between the two loops causing currents of a second harmonic value to flow therein. Therefore, the second harmonic error signal may be balanced out by maintaining the two loops in balance by adjusting the resistance values of the resistors 42 and 43. In this fashion the signal appearing at the output winding 37 will be a difference signal that will be compensated for the periodic signals whereby the encoder shaft will follow the shaft to be digitized with the exception of the errors introduced by the so-called non-periodic error signals.

The non-periodic error signals may also be readily determined for a complete cycle of the multi-pole resolvers. These errors may be corrected by means of a correction cam cut in accordance with these predetermined non-cycle error signals or having a profile corresponding thereto. The non-periodic errors have been found to produce very slight errors and, therefore, the size of the cam must be proportioned relative to the sensing element, in this instance a cam follower, whereby all the errors may be sensed without overriding the smaller errors due to the slope of the correction cam. To this end, the cam 45 is provided with an enlarged diameter relative to the diameter of the encoder disc 14 and is driven by means of a step-down gearing arrangement 46 proportioned to cause the error profile of the cam 45 to exactly correspond to the position of the encoder disc 14 where the compensation is required to produce the correct digital output indication. The gearing 46 may then be coupled to be driven by the servomotor 39. The correction cam is utilized in conjunction with a cam follower or lever arm 48 having one end mounted in a cantilevered relationship to the encoder case 18 to ride on the error-profiled surface of the cam 45. The lever arm then rotates the encoder case 18 and thereby the sensing elements 16 in a direction governed by the cam 45 to correct for the non-periodic signals and thereby produce the correct digital output indication.

Although the invention has been described and shown with the reference voltage source 33 exciting the multi-pole resolver, the circuit is bilateral and the reference voltage may be employed to excite the single pole resolver and the error signal would then be derived from the multi-pole resolver. In a practical embodiment of the invention, the reference voltage source 33 was connected to the winding 37 in parallel with the transformer 41. The winding 37, of course, would be disconnected from the amplifier 38 and used merely to excite the transmission loops. The only other circuit change would be the interconnecting of the error signal which will now appear in the winding 32 to the input of the amplifier 38.

It should be noted that although the invention has been described in conjunction with the combination of electrical compensating means and mechanical correction means, the correction may be provided by the electrical means alone or by the mechanical means alone, depending upon the accuracy desired. It should be noted that when the combination of the electrical and mechanical means is utilized, as compared with the use of the correction cam alone to the high order of accuracies desired for space projects, the required slope of the cam having the periodic and non-periodic error signals recorded thereon may be reduced by a factor of approximately five. This reduction in slope results since the periodic error signals have been subtracted and need not be recorded. With the combination of periodic and non-periodic signals recorded on a correction cam, some difficulty has been experienced in sensing the minutest non-periodic signals in views of the physical limitations of a cam follower in sensing the correction cam for the minute errors without resorting to an oversized correction cam.

It should now be evident that this invention has advanced the state of the art through the provision of compensating means for multi-pole resolvers to cancel out both periodic and non-periodic signals whereby a remote shaft may be digitized with accuracies of five seconds of arc, R.M.S., and fifteen seconds of absolute error. Accuracies with mechanical compensation alone are approximately twenty seconds R.M.S. and one minute absolute.

What is claimed is:

1. An arrangement for digitally encoding the positions of a movable member comprising an encoder having an element with a plurality of binary coded segments thereon to define a plurality of discrete encoding positions and means for sensing the coded segments and providing a plurality of binary coded electrical signals representative of the positions of a member to be digitized upon the production of relative movement between said encoding elements, means for producing relative movement between said element and said sensing means, electrical gearing coupled to a movable member to be digitized and movable therewith to provide an electrical output signal representative of the position of the movable member, said electrical output signals including predetermined error signals inherent in the operation of the gearing, means coupled to said encoder for providing an electrical indication of the relative positions of said encoding elements, comparison means responsive to said gearing and the electrical indication of the relative positions of said encoding elements for deriving an error signal indicative of the difference in position therebetween and connected to said means for producing relative movement between said encoding elements for driving said encoder in unison with said movable member, and means coupled to said encoder for compensating for the predetermined inherent errors of said gearing to provide the correct digital indication of the position of the movable member therefrom.

2. An arrangement for digitally encoding the positions of a movable member comprising an encoder having an element with a plurality of binary coded segments thereon to define a plurality of discrete encoding positions and means for sensing the coded segments and providing a plurality of binary coded electrical signals representative of the positions of a member to be digitized upon the production of relative movement between said element and said sensing means, means for producing relative movement between said element and said sensing means, electrical step-up gearing coupled to a movable member to be digitized and driven thereby to be movable therewith to provide an electrical output signal representative of the position of the movable member, said electrical output signals including predetermined error signals inherent in the operation of the gearing, means coupled to said encoder for providing an electrical indication of the relative positions of said element and said sensing means of said encoder, comparison means responsive to said gearing and the electrical indication of the said relative position of the encoding elements for deriving an error signal indicative of the difference in position therebetween and connected to said means for producing relative movement between said encoding elements for driving said encoder in unison with said movable member, and correction means having the predetermined inherent error characteristics of the electrical gearing means prerecorded thereon, means for moving said correction means at a rate related to the movements of the movable member to be digitized, and means connected to be responsive to said correction means for producing relative movement between said encoding elements in a direction to compensate for the predetermined error signals produced by said electrical gearing.

3. An arrangement for digitally encoding the positions of a movable member as defined in claim 2 wherein said correction means comprises a cam having a profile of the predetermined inherent errors of said gearing prerecorded thereon and a cam follower for said cam to sense said cam profile and to produce the relative movement between said encoding elements in accordance therewith.

4. An arrangement for digitally encoding the positions of a movable member comprising an encoder having an element with a plurality of binary coded segments thereon to define a plurality of discrete encoding positions and means for sensing the coded segments and providing a plurality of binary coded electrical signals representative of the positions of a member to be digitized upon the production of relative movement between said encoding elements, means for producing relative movement between said encoding elements, electrical gearing coupled to a movable member to be digitized and movable therewith to provide an electrical output signal representative of the position of the movable member, said electrical output signals including predetermined error signals inherent in the operation of the gearing, means coupled to said encoder for providing an electrical indication of the relative positions of said encoding elements, comparison means responsive to said gearing and the electrical indication of the relative positions of said encoding elements for deriving an error signal indicative of the difference in positions between said movable member and said encoder and connected to said means for producing relative movement between said encoding elements for driving said encoder in unison with said movable member, and means coupled to said comparison means for electrically compensating for the predetermined errors in the signals from said gearing to provide the correct digital indications from said encoder.

5. An arrangement for digitally encoding the positions of a rotatable shaft comprising a shaft position digitizer having an element with a plurality of binary coded segments thereon to define a plurality of discrete positions and means for sensing the coded segments and providing a plurality of binary coded electrical signals representative of the positions of the shaft to be digitized upon the production of relative movement between said digitizing elements, means for producing relative movement between said digitizing elements, a multi-pole resolver coupled to a shaft to be digitized and rotatable in unison therewith to provide an electrical output signal representative of the position of the movable member, said electrical output signals including predetermined error signals inherent in the operation of the gearing, a single pole resolver connected to be responsive to said multi-pole resolver and coupled to said digitizer for providing an electrical indication of the relative positions of said digitizing elements through the production of an error signal indicative of the difference in positions between said rotatable shaft member and said digitizer and connected to said means for producing relative movement between said digitizing elements for driving said digitizer in unison with said shaft, a source of reference potential coupled to said multi-pole resolver, and means coupled to said source of reference potential for injecting a voltage of substantially equal magnitude and opposite in phase to said predetermined inherent error signals into said single-pole resolver.

6. An arrangement for digitally encoding the positions of a rotatable shaft as defined in claim 5 wherein said predetermined error signals comprise a fundamental error signal and a harmonic thereof and said injection voltage compensates for the fundamental error signal and including means for balancing the impedance in the coupling between said resolvers to compensate for the harmonic error signal.

7. An arrangement for digitally encoding the positions of a shaft including, in combination, a shaft position digitizer having an element with a plurality of binary coded segments thereon and a corresponding plurality of sensing elements therefor providing binary coded electrical indications of the positions of the shaft to be digitized upon production of relative rotation between said digitizing elements, a multi-pole electrical resolver including a stationary reference winding and a pair of rotor windings arranged in an electrical quadrature relationship with respect to the reference winding and adapted to be mounted on a shaft to digitized to rotate in unison therewith, a source of reference potential connected to said reference winding for said multi-pole resolver, a single-pole resolver including a stationary output winding and a pair of rotor windings arranged in a quadrature and differential relationship relative to said input winding and mounted to be rotatable with said digitizer shaft, means for connecting each one of the rotor windings of said multi-pole resolver to the winding of the single-pole resolver of the opposite quadrature relationship to thereby form a pair of substantially balanced closed loops whereby the voltage developed in the stationary winding of said single-pole resolver is representative of the difference in the positions of the shaft to be digitized and the digitizer shaft, said multi-pole resolver being further characterized as producing predetermined error signals occurring periodically and non-periodically throughout a complete revolution of the rotor windings of said multi-pole resolver, means coupled to said source of reference potential for injecting a voltage of substantially equal magnitude and opposite in phase to said predetermined error signals into at least one of said loops for compensating for the periodic errors occurring in said multi-pole resolver, said latter-mentioned means including means for maintaining the other of said loops in balance relative to the loop including the injection voltage to cause the periodic error signal to be subtracted from the stationary winding of said single-pole resolver, means responsive to said difference signal for producing relative rotation between digitizing elements, a cam having the non-periodic errors of said multi-pole resolver recorded thereon, means for driving said cam at a reduced speed related to the rotation of said rotors of the multi-pole resolver, a cam follower mounted on said digitizer and arranged for following said correction cam to produce relative rotation between said digitizing elements in a direction to compensate for the non-periodic errors of the multi-pole resolver.

8. An arrangement for digitally encoding the positions of a shaft including, in combination a digital encoder including a rotatable shaft mounting a disc having a plurality of binary coded segments thereon and a plurality of sensing elements therefor, said encoder further including means for mounting said sensing elements in a stationary position relative to said rotatable shaft and thereby said disc, a multi-pole electrical resolver including a stationary reference winding and a pair of rotor windings arranged in an electrical quadrature relationship with respect to the reference winding and adapted to be mounted on a shaft to be digitized to rotate in unison therewith, a source of reference potential connected to said reference winding for said multi-pole resolver, a single-pole resolver including a stationary output winding and a pair of rotor windings arranged in a quadrature and differential relationship relative to said output winding and mounted to be rotatable in unison with said encoder shaft, means for connecting each one of the rotor windings of said multi-pole resolver to the winding of the single-pole resolver of the opposite quadrature relationship to thereby form a pair of substantially balanced closed loops whereby the voltage developed in the stationary winding of said single-pole resolver is representative of the difference in the positions of the shaft to be digitized and the encoder shaft, said multi-pole resolver being further characterized as producing predetermined error signals occurring periodically and non-periodically throughout a complete revolution of the rotor windings of said multi-pole resolver, means coupled to said source of reference potential for injecting a voltage of substantially equal magnitude and opposite in phase to said predetermined error signals into at least one of said loops for compensating for the periodic errors occurring in said multi-pole resolver, said latter-mentioned means including means for maintaining the other of said loops in balance relative to the loop including the injection voltage to cause the periodic error signal to be subtracted from the stationary winding of said single-pole resolver, means responsive to said difference signal for rotating the rotatable shaft of said encoder, a cam cut to have the non-periodic errors of said multi-pole resolver predetermined recorded thereon, means for driving said cam at a speed related to the rotation of said rotors of the multi-pole resolver, a cam follower mounted on said means for mounting said sensing elements for following said correction cam to rotate said means and thereby the sensing elements in a direction to compensate for the non-periodic errors of the multi-pole resolver.

9. An arrangement for digitally encoding the positions of a shaft as defined in claim 8 wherein said periodic error signals comprise a fundamental and second harmonic error signal and the injected voltage is proportoned to compensate for the fundamental error signals and said means for maintaining said loops in balance comprising variable impedance means for balancing out the second harmonic.

10. An arrangement for digitally encoding the positions of a shaft as defined in claim 9 wherein said cam is of an enlarged size and is driven by a step-down gearing arrangement related to the enlarged size.

References Cited by the Examiner

UNITED STATES PATENTS

| | | | |
|---|---|---|---|
| 2,906,934 | 9/59 | Bower et al. | 318—28 |
| 2,971,141 | 2/61 | Gevas | 318—28 |
| 2,999,965 | 9/61 | Airey | 340—347 |
| 3,105,230 | 9/63 | MacIntyre | 340—347 |

MALCOLM A. MORRISON, *Primary Examiner.*

STEPHEN W. CAPELLI, *Examiner.*